United States Patent [19]
Palmer

[11] Patent Number: 5,448,499
[45] Date of Patent: Sep. 5, 1995

[54] MISPOUR-MISFILL PREVENTION APPARATUS AND PROCESS

[75] Inventor: Paul J. Palmer, Chandler, Ariz.

[73] Assignee: Olin Corporation, Stamford, Conn.

[21] Appl. No.: 933,627

[22] Filed: Aug. 24, 1992

[51] Int. Cl.6 .............................................. G06G 7/58
[52] U.S. Cl. .................................. 364/500; 364/496
[58] Field of Search ............... 364/496, 497, 498, 500, 364/413.01; 235/375; 222/52; 73/23.2, 40.5 R

[56] References Cited

U.S. PATENT DOCUMENTS

| | | | |
|---|---|---|---|
| 4,044,227 | 8/1977 | Holm et al. | 235/61.7 R |
| 4,338,279 | 7/1982 | Orimo et al. | 364/497 X |
| 4,525,071 | 7/1985 | Horowitz et al. | 366/152 |
| 4,538,072 | 8/1985 | Immler et al. | 250/568 |
| 4,636,634 | 1/1987 | Harper et al. | 250/223 R |
| 4,668,476 | 5/1987 | Bridgham et al. | 364/500 X |
| 4,750,133 | 6/1988 | Eiskamp et al. | 364/497 |
| 4,852,025 | 7/1989 | Herpichbohm | 364/497 X |
| 4,853,521 | 8/1989 | Claeys et al. | 364/413.01 X |
| 4,855,909 | 8/1989 | Vincent et al. | 364/413.01 |
| 4,896,034 | 1/1990 | Kiriseko | 250/271 |
| 4,925,444 | 5/1990 | Orkin et al. | 604/80 |
| 4,935,875 | 6/1990 | Shah et al. | 235/375 X |
| 4,953,075 | 8/1990 | Nau et al. | 364/497 X |
| 4,976,137 | 12/1990 | Decker et al. | 73/53 |
| 5,028,769 | 7/1991 | Claypool et al. | 235/454 |
| 5,122,342 | 6/1992 | McCulloch et al. | 364/497 X |
| 5,282,149 | 1/1994 | Grandone et al. | 364/497 |

Primary Examiner—Emanuel T. Voeltz
Assistant Examiner—Kyle J. Choi
Attorney, Agent, or Firm—William A. Simons; Ralph D'Alessandro

[57] ABSTRACT

A system and a process for monitoring the supplying of a working apparatus (e.g., spray etching tool employed in the semiconductor industry) via a flow control valve from a supply container to ensure the proper chemical is delivered to said working apparatus by (1) applying an optical bar code scanning label on the supply container and either the working container or the flow control valve or both and then (2) comparing the sensings of said bar code labels with a microprocessor controller that is programmed to open the flow control valve, if the comparings show a match and to send a visual error message and a signal to leave the flow control valve closed if the comparing shows a mismatch.

7 Claims, 3 Drawing Sheets

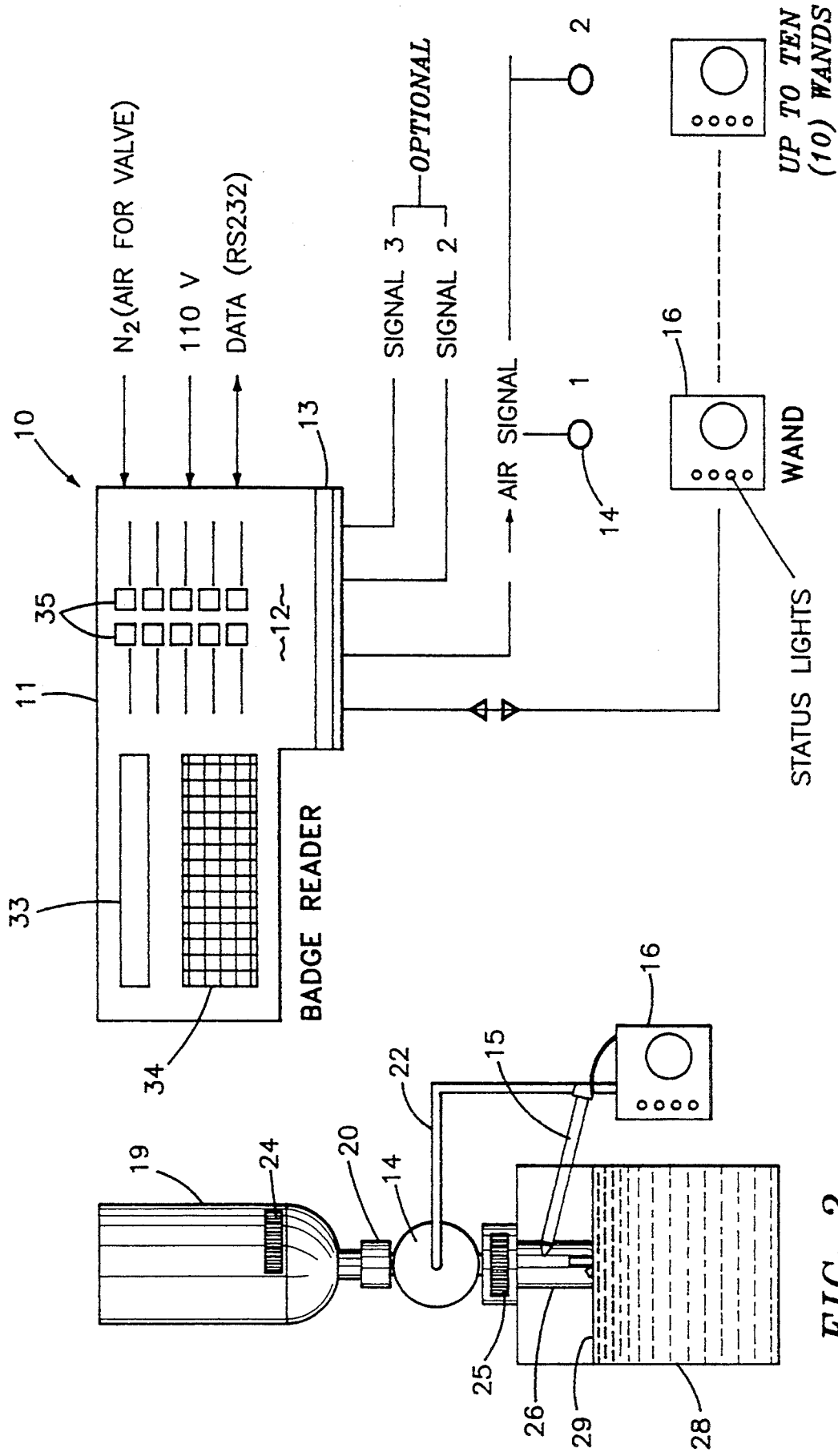

MISPOUR-MISFILL PREVENTION APPARATUS AND PROCESS

FIELD OF INVENTION

This invention relates generally to a system for preventing misfillings of chemical containers. More specifically, this invention relates to a system that prevents an incorrect working liquid from being added to a working apparatus and the method of employing a bar code-based system that prevents the flow of chemicals from a chemical refill or supply container through a flow valve into a working apparatus.

BACKGROUND OF THE INVENTION

Various optical scanning devices have been employed to facilitate working with liquids, manufactured articles and detecting the presence of objects. For example, U.S. Pat. No. 4,538,072 discloses an optical wand that can be used for reading bar code marks that can be portable and usable in a plurality of applications. U.S. Pat. No. 4,525,071 reveals the use of bar code scanners in controlling and batching inventory delivery systems. U.S. Pat. No. 4,636,634 discloses a system where a bar code reader determines the presence of a manufactured article, such as a semiconductor device, in a bin wherein a wafer cassette box is provided with a suitable bar code.

It has been known to label liquid containers, such as bottles, with identification codes so they can be located and tracked throughout a system. U.S. Pat. No. 4,855,909 and U.S. Pat. No. 5,028,769 disclose the use of such codes on liquid containing bottles. Other approaches have been taken to control the volume and timing of the flow of liquids into a mixing container, such as that disclosed in U.S. Pat. No. 4,976,137.

However, no effective system has been designed to permit optical scanning or sensing of the contents of the container and tying the scanning of such a label to the opening or closing of a valve to ensure that only the proper liquid of the proper concentration enters a working apparatus.

A need exists for a reliable system to ensure that human operators do not fill or refill a working apparatus, such as a spray etching tool utilizing cleaning etching solutions employed in the semiconductor industry, with the wrong chemical or the wrong concentration. A serious problem can result if the wrong concentration chemical, such as an acid, or the entirely wrong chemical, such as hydrofluoric acid instead of sulfuric acid, is added or used to fill or refill a working apparatus. Such mistakes can destroy entire lots of expensive products, such as semiconductor wafers, damage the working apparatus, or both.

These problems are solved in the design and process of the present invention by utilizing a sensing system which determines from the label on the container the liquid being employed and determines whether that liquid is a proper match for the working apparatus and the valve controlling the flow of liquid into that apparatus. The design and process of the present invention provide prevent the filling of a working apparatus with the improper chemical, so that an automated control valve opens only when a proper match is made between the supply or fill container and the working apparatus.

SUMMARY OF THE INVENTION

It is an object of the present invention to provide an apparatus and process that will prevent the filling of a working apparatus with an improper chemical by removing the potential for operator or human error in connecting an improper chemical supply container to the working apparatus.

It is another object of the present invention to provide an apparatus and process which is reliable and simple to use.

It is still another object of the present invention to provide an apparatus and a process that employs optical scanning equipment to prevent the filling of a working apparatus with an improper chemical.

It is a feature of the present invention that an automated pneumatic valve is employed to prevent the misflow of an improper chemical into a working apparatus.

It is another feature of the present invention that the automated pneumatic flow or control valve can also be coupled with a manual control valve to provide redundancy for flow control between a supply or refill container and working apparatus.

It is still another feature of the present invention that a microprocessor can be employed to control the automatic opening of the automated pneumatic flow control valve.

It is yet another feature of the present invention that an optical scanning wand is employed to read the labels on the supply or refill containers.

It is a further feature of the present invention that any bar code that uniquely defines the product, such as the part number on the supply container, can be used to identify the correct chemical to be used.

It is an advantage of the present invention that the apparatus is part of a portable system.

It is another advantage of the present invention that the automated flow control valve is normally in a no flow position.

It is still another advantage of the present invention that the automated flow control valve only opens when there is a proper fill container-working apparatus match sensed via the optical scanning wand in the controller.

It is yet another advantage of the present invention that the microprocessor controller can provide both audial and visual display instructions to the operator.

It is yet a further advantage that the software within the microprocessor controller can be modified to accept refill or supply containers from different vendors or suppliers without having to change the bar code lables on the flow control values.

These and other objects, features and advantages are obtained by the apparatus and process of the present invention to prevent the filling of a working apparatus with an improper chemical, either due to wrong concentrations or the wrong chemical, via the use of optical scanning apparatus which scans and compares the bar code labels on a fill container and on an automated flow control valve which are both connected to a microprocessor controller. The microprocessor controller is programmed to issue commands to an actuator to open the flow control valve in response to a proper fill container-working apparatus match between the bar code data on the fill container and the flow control valve labels.

BRIEF DESCRIPTION OF THE DRAWINGS

The objects, features and advantages of the invention will become apparent upon consideration of the following detailed disclosure of the invention, especially when it is taken in conjunction with the accompanying drawings wherein:

FIG. 1 is a diagrammatic illustration of the system employing a plurality of portable scanning wands connected to a microprocessor controller which is linked to the pneumatic automated flow control valve that in turn connects the refill container and the working apparatus;

FIG. 2 is a diagrammatic illustration of the system having a portable optical scanning wand connected between a fill container and a working apparatus to control the opening of the automatic pneumatic control valve;

DETAILED DESCRIPTION OF THE PREFERRED EMBODIMENT

Figure 3:
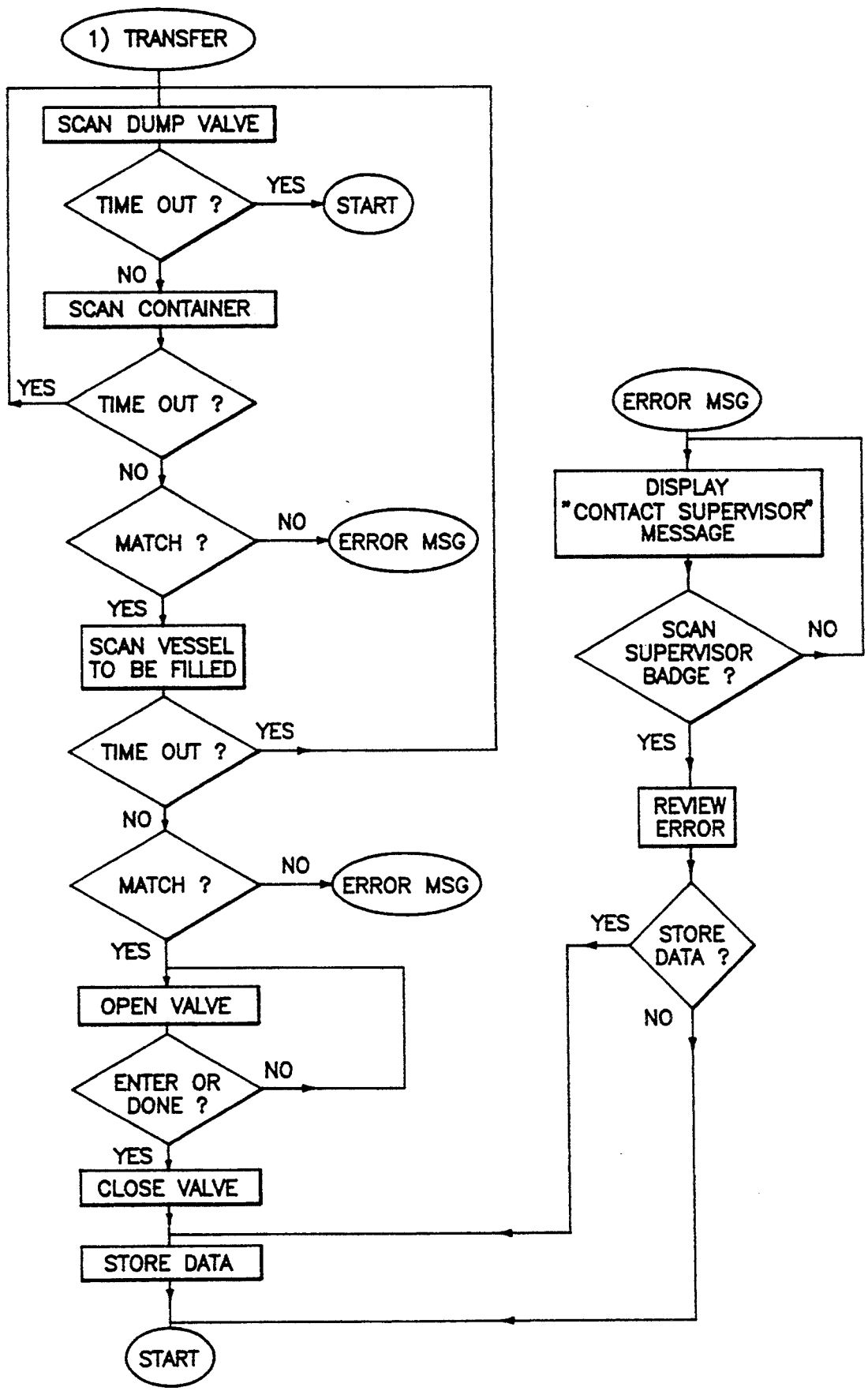
FIG. 3 is a diagrammatic flow control logic chart for the fill operation of the process of the instant invention.

FIG. 1 shows a diagrammatic illustration of the misfill/mispour system 10 utilizing a microprocessor controller or computer 11 having an operator display panel 12 and at least one remote wand optical scanner 16 connected to at least one automated flow control valve 14. The automated flow control valve 14 is preferably pneumatically operated.

The remote wand optical scanner 16 can be any suitable sensing device, such as a bar code reader which redundantly line scans across the bars on a label placed on a suitable container and automated flow control valve 14 to produce a video signal having an amplitude pattern corresponding to the scanned bar code. A decoder is then coupled to the optical scanner and can include a digitizer for the raw video signal. Any suitable optical scanner can be employed. A preferred type is the model 9191 Satellite Wand Station produced by Intermec Corporation of Lynnwood, Washington. A preferred wand is the Model 1260 Series digital industrial wand, also produced by Intermec. This wand is shown as wand 15 in FIG. 2. This input device is then connected to the operator display panel 12.

Controller 11 has an operational display panel and can be operated independently as a microprocessor or connected via appropriate connecting cable, such as an RS232 cable, to a computer for two-way communication. A preferred microprocessor controller is the Model 9560 transaction manager, also produced by Intermec Corporation. This is capable of performing multiple functions including the monitoring of the opening and closing of contact closures within the operator display 12 and the collection of data via the use of an on line bar code reader. The controller 11 has the ability to retain bar code readings and to look up data in stored tables. A pneumatic relay (not shown) via the contact closures (also not shown) within the operator display panel 12 connects the controller 11 and the automated flow control valve 14. The pneumatic relay converts electric signals to pneumatic signals to provide the air supply to the pneumatically operated automated flow control valve 14. A preferred pneumatic relay is the model NVJ114 produced by SMC Corporation, which is a 5 volt DC pneumatic valve with an about ¼ inch air line. The air supply line 22 employs an automatic shut-off on a valve so that upon disconnection, the air through the line is automatically shut down. The tubing is preferably about a ¼ inch outer diameter TEFLON ® polytetrafluoroethylene tube. A preferred quick disconnect is that available from Ryan Herco as the DESO quick disconnect with a double end shut off.

The automated flow control valve 14 is in the normally closed position during operation, until activated pneumatically to open and permit the flow of a fill chemical into the working apparatus. As seen in FIG. 2, flow control valve 14 is connected to a refill container 19 via a threaded valve top or bottle adaptor 20 and has an air line 22 connected thereto from a compressed air source controlled by the controller II. A preferred valve is available from R-K Industries of Ontario, CA as a Type 1 NLA non-lubricated air valve that is modified to operate under water. The valve is ported to allow air to go into a chamber with a polymer coated spring having an enlarged vent hole. The polymer coating on the spring is preferably either TEFLON ® polytetrafluoroethylene or TEFZEL ® or HALAR ® polymer. There is a bar code label 24 on the refill container 19 and a corresponding bar code label 25 on the automated flow control valve 14. Below the bar code label 24 is a valve neck 26 that extends down from the flow control valve 14 into the liquid receiving container 28. As seen in FIG. 2, the optical scanning wand 15 is connected to the wand station 16.

Wand station 16 has four status lights which serve the following purpose. The first status light or "scan tool" indicator light serves as a prompt to the operator to scan a bar code label (not shown) on the working apparatus to be filled with an optical scanning wand 15, causing the microprocessor controller 11 to search the look up tables in the software to identify the proper flow control valve 14 and refill container 19 that should be matched with that particular working apparatus.

The second status light or "scan flow control" indicator light prompts the user to scan the bar code part number from the valve bar code label 25 with the optical scanning wand 15. The second status light remains illuminated and a short audial beep is emitted to indicate that there is a match with the proper chemical coded on the working apparatus and the valve label 25. If there is an mismatch between the valve label 25 and the proper chemical coded on the working apparatus, an error message is displayed on the operator display panel 12 of the controller 11 and the second status light flashes to indicate an error is present.

Assuming that the working apparatus 28 and the valve bar code label 25 information matches, the third status light or "scan bottle" indicator light comes on to prompt the operator to verify the chemical within the container 19 indicated by scanning the bar code label 24 containing the preprogrammed information with the optical scanning wand 15. If the wrong chemical is contained within the container 19 and there is a mismatch with the chemical, then the third status light flashes and an error message appears on the operator display panel 12. If the chemical container 19 and the valve 14 bar code label information matches, the fourth status light or "valve open" indicator light of wand station 16 illuminates when air is sent to the automated flow control valve 14 and the valve 14 is opened. An audible beep is also emitted every few seconds from the operator display panel 12 within the controller 11 for a specific programmed time.

The operator can stop the chemical flow from the refill container 19 through the automated flow control valve 14 by doing one of three steps. The air line 22 can be disconnected from the flow control valve 14; a different and incorrect bar code can be wanded with scanning wand 15, preferably a "stop" bar code; or the "Enter" key on the operator display panel 12 can be pressed to terminate the flow of chemical through the valve 14.

Assuming the chemical transfer is uninterrupted and has been completed so that the receiving liquid container 28 is full, the operator disconnects the air line 22 from the automated flow control valve 14 and removes the automated flow control valve 14 and the attached refill container 19 from the container 28. The refill container 19 is returned to an upright position and the automated flow control valve 14 is removed. The refill container 19 is then either discarded if empty, or stored, if still containing chemical.

Returning to the controller 11 shown in FIG. 1, a badge reader slot 13 is provided through which the operator slides his identification badge (not shown) to log in and to activate the operator display panel 12 prior to selecting a chemical for transfer from the menu. As seen in FIG. 1, operator display panel 12 includes a two line by forty character program screen 33 that is interactive with the operator. Beneath the screen 33 is an alphabetic membrane key pad 34 which permits the operator to select desired chemicals from the menu and give instructions. On the right side of the operator display panel are function keys 35 ranging from 1 through 10. At least four of the function keys are utilized with the F1 function key being for "Help" commands, the F2 function key being for transferring the chemical, the "F3" function key giving instructions to clean the automated transfer control valve 14, and the "F4" function key being for stopping or escaping the software program and refill operation. FIG. 1 also shows that inputs are provided for the compressed air line which contains the nitrogen gas, a 110 volt power supply line, and a data link connecting cable. The controller 11 can be connected to as many as 3 signals to provide air to different valves.

Should the operator decide to activate the cleaning of the automated flow control valve 14 prior to being put in storage, the following steps should be followed. The operator passes his/her badge (not shown) through the operator display panel badge reader 13 and selects the "clean dump valve" key from the function keys menu. This should cause the second light or the "scan control valve" indicator light on the remote wand station 16 to illuminate. The air line 22 is connected to the automated flow control valve 14 and the remote wand 15 is used to optically scan the valve bar code label 25. This causes the fourth status light or "valve open" indicator light on wand station 16 to illuminate, indicating that air is present, and the automated flow control valve 14 to open for about 5 seconds. The flow control valve 14 is then sprayed with deionized water, after which the second status light or "scan control valve" indicator light will flash and the audial beeping alarm will sound. Should it be desired to repeat the cleaning, the remote wand 15 will optically scan the valve bar code label 25 and the procedure will be repeated. At the end of the time, the controller 11 will return to the main menu.

Should there be an error during the transfer of the chemical, the controller 11 is programmed so that a supervisor badge (not shown) is required to reset the operator display panel 12. The error must be reviewed with the supervisor and an opportunity is provided for the supervisor of the operator to review and explain how a mispour procedure could have resulted from the actions taken by the operator. The controller 11 gives the supervisor the ability to store the data for the near mispour, or to continue operation without storing the data.

The assembly employing the automated flow control valve 14 and the refill container 19 is designed so that when the valve 14 and container 19 are placed on the liquid receiving container 28, the chemical will not overflow due to the presence of a "fluid column" created in the automated flow control valve 14 and the refill container 19. No further fluid can flow due to the lack of air in the bottle when the container 28 is full. The fluid 29 in the container 28 acts as a seal to prevent any further fluid from flowing into the liquid receiving container 28. Once the automated flow control valve 14 is pneumatically closed, the liquid container 28 can support the small amount of chemical present on the down stream side of the valve 14 from the refill container 19.

FIG. 3 shows a logic flow chart that is variation of the logic employed with the misfill/mispour system 10 and the controller 11 in the fill operation as described above. Instead of scanning the vessel to be filled or liquid receiving container 28 first, this flow chart initiates the scanning operation by first scanning the flow control valve 14, then scanning the refill container 19 and finally scanning the liquid receiving container 28 in the working apparatus. The reference to the dump valve under the transfer step is describing the automated transfer control valve 14 and the first container scanned is the refill container 19. The vessel to be filled referred to in the flow chart is the liquid container 28.

Figure 4:
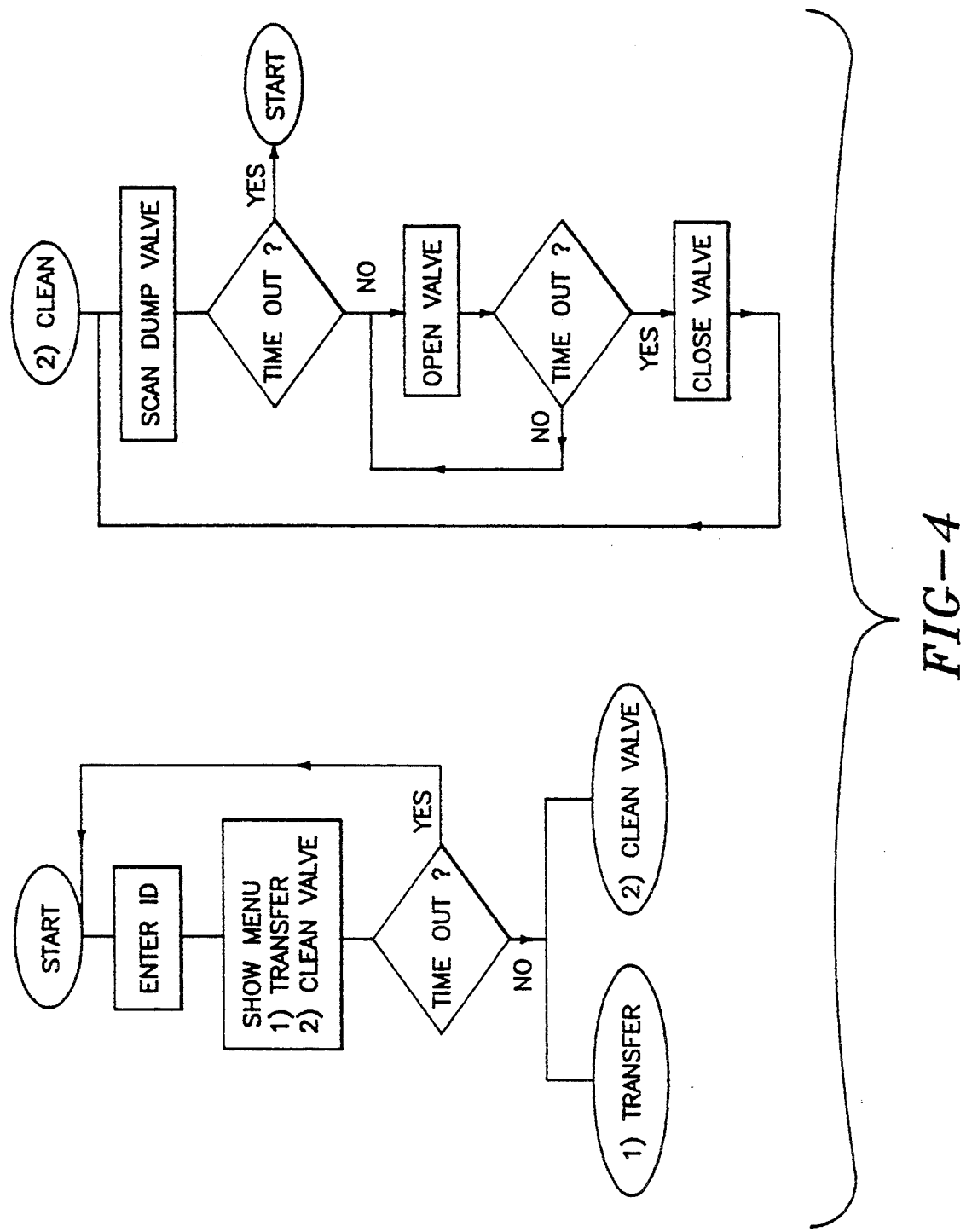
FIG. 4 is a diagrammatic flow control logic chart for the initial log in operation on the operator display panel and for the cleaning operation of the process of the instant invention.

FIG. 4 shows the logic flow chart employed in the initial log in operation and in the cleaning operation.

While the invention has been described above with references to specific embodiments thereof, it is apparent that many changes, modifications and variations in the materials, arrangements of parts and steps can be made without departing from the inventive concept disclosed herein. It should be noted that any bar code which uniquely defines the product in the refill container 19, such as the vendor part number, can be used to supply the match with the preprogrammed information on the bar code label of the working apparatus through the use of look up tables present in the software within the operator panel microprocessor. Also, a separate pneumatic relay could be employed at each remote wand station 16 to individually control the signals to each wand station and to isolate each automatic control valve 14 so that only one valve could be open at a time. Finally, although the instant invention is described with regard to monitoring and controlling the flow of a chemical, it is to be understood that any liquid whose flow must be monitored could similarly be controlled by the process and system of the present invention, such as, for example, intravenous fluids that must be fed into the body. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A process for monitoring the supplying of a working apparatus with a chemical from a supply container via a flow control valve to ensure the proper chemical is delivered to the working apparatus comprising the steps of:
    (a) sensing preprogrammed bar coded information located on said working apparatus that identifies a proper chemical to be used with said working apparatus.
    (b) sensing preprogrammed bar coded information located on said flow control valve that identifies a proper chemical to be transferred through said flow control valve;
    (c) sensing preprogrammed bar coded information located on said supply container that identifies the chemical held in said supply container;
    (d) comparing said preprogrammed bar coded information to determine if the chemical in the supply container, the proper chemical to be transported through the flow control valve and the proper chemical to be used in the working apparatus match; and
    (e) sending a signal to an actuator to open said flow control valve connecting said supply container and said working apparatus, thereby permitting the chemical to flow into said working apparatus, if the comparing of the three sensings shows a match or sending a visual error message and a signal to leave said flow control valve closed if the comparing of the three preprogrammed bar coded information sensings show a mismatch.

2. A system for monitoring the supplying of a working apparatus with a chemical from a supply container via a flow control valve to ensure the proper chemical is delivered to the working apparatus, comprising in combination:
    (a) a working apparatus employing a chemical and having a first bar code label thereon that is sensed that identifies a proper chemical to be used therein;
    (b) a supply container holding the chemical to be used in said working apparatus, said supply container having a second bar coded label thereon that is sensed that identifies the chemical contained therein;
    (c) a flow control valve connecting said working apparatus and said supply container, said flow control valve having a third bar coded label thereon that identifies the proper chemical to be transported therethrough;
    (d) an optical scanner for sensing the preprogrammed bar coded information from the three bar coded labels; and
    (e) a microprocessing controller for (i) comparing the three preprogrammed bar coded information sensings to determine if the proper chemical to be used in said working apparatus, the proper chemical to be transferred through said flow control valve, and the chemical in the supply container match and (ii) sending a signal to an actuator to open the flow control valve connecting the supply container and said working apparatus to permit the chemical to flow to the working apparatus if the comparings of the three preprogrammed information sensings show a match or sending a Visual error message and a signal to leave the flow control valve closed if the comparings of the three preprogrammed bar coded information sensings show a mismatch.

3. A process for monitoring the supplying of a working apparatus with a chemical from a supply container via a flow control valve to ensure the proper chemical is delivered to the working apparatus comprising the steps of:
    (a) sensing preprogrammed bar coded information located on said flow control valve connected to said working apparatus that identifies a proper chemical to be used with said working apparatus;
    (b) sensing preprogrammed bar coded information located on said supply container that identifies the chemical in said supply container;
    (c) comparing said preprogrammed bar coded information sensings to determine if the chemical in said supply container and the proper chemical to be used in said working apparatus match;
    (d) sending a signal to an actuator to open said flow control valve connecting said supply container and said working apparatus, thereby permitting the chemical to flow into said working apparatus, if the comparing of the two preprogrammed information sensings show a match or sending an error message and a signal to leave the flow control valve closed if the comparing of the two preprogrammed bar coded information sensing show a mismatch.

4. A process for monitoring the supplying of a spray etching tool employed in the semiconductor industry with a chemical from a supply container via a flow control valve to ensure the proper chemical is delivered to said spray etching tool apparatus comprising the steps of:
    (a) sensing preprogrammed bar coded information located on said spray etching tool or on said flow control valve connected to said spray etching tool that identifies a proper chemical to be used with said spray etching tool;
    (b) sensing preprogrammed bar coded information located on said supply container that identifies the chemical in said supply container;
    (c) comparing said preprogrammed bar coded information sensings to determine if the chemical in said supply container and the proper chemical to be used in said spray etching tool match;
    (d) sending a signal to an actuator to open said flow control valve connecting said supply container and said spray etching tool, thereby permitting the chemical to flow into said spray etching tool, if the comparing of the two preprogrammed information sensings show a match or sending an error message and a signal to leave the flow control valve closed if the comparing of the two preprogrammed bar coded information sensing show a mismatch.

5. A process for monitoring the supplying of a working apparatus with a chemical from a supply container via a flow control valve to ensure the proper chemical is delivered to the working apparatus comprising the steps of:
    (a) sensing preprogrammed bar coded information located on said working apparatus or on said flow control valve connected to said working apparatus that identifies a proper chemical to be used with said working apparatus;
    (b) sensing preprogrammed bar coded information located on said supply container that identifies the chemical in said supply container;

(c) comparing said preprogrammed bar coded information sensings to determine if the chemical in said supply container and the proper chemical to be used in said working apparatus match;

(d) sending a signal to an actuator to open said flow control valve connecting said supply container and said working apparatus, thereby permitting the chemical to flow into said working apparatus, if the comparing of the two preprogrammed information sensings show a match or sending an error message and a signal to leave the flow control valve closed if the comparing of the two preprogrammed bar coded information sensing show a mismatch;

(e) displaying a visual signal on a display panel when the flow control valve is open; and (f) displaying a flashing visual signal on a display panel when the error message is sent.

6. A system for monitoring the supplying of a working apparatus with a chemical from a supply container via a flow control valve to ensure the proper chemical is delivered to the working apparatus, comprising in combination:

(a) a working apparatus employing a chemical and having a flow control valve connected thereto, said flow control valve having a first bar code label thereon that is sensed to identify a proper chemical to be used in said working apparatus;

(b) a supply container holding the chemical to be used in the working apparatus, said supply container being connected to the working apparatus via said flow control having a second bar code label thereon that is sensed to identify the chemical contained therein;

(c) apparatus for sensing said preprogrammed bar coded information on said flow control valve for the chemical to be used with said working apparatus and for sensing said preprogrammed bar coded information on said supply container for the chemical held within the supply container; and (d) a microprocessing controller for (i) comparing the two preprogrammed bar coded information sensings to determine if the proper chemical to be used in the working apparatus and the chemical in the supply container match and (ii) sending a signal to an actuator to open said flow control valve connecting said supply container and said working apparatus to permit the chemical to flow to said working apparatus if the comparing of the two preprogrammed information sensings show a match or sending an error message and a signal to leave the flow control valve closed if the comparing of the two preprogrammed bar coded information sensings show a mismatch.

7. A system for monitoring the supplying of a spray etching tool employed in the semiconductor industry with a chemical from a supply container via a flow control valve to ensure the proper chemical is delivered to the spray etching tool, comprising in combination:

(a) a spray etching tool employing a chemical and having a flow control valve connected thereto, either said spray etching tool or said flow control valve having a first bar code label thereon that is sensed to identify a proper chemical to be used in said spray etching tool;

(b) a supply container holding the chemical to be used in said spray etching tool, said supply container being connected to said spray etching tool via said flow control having a second bar code label thereon that is sensed to identify the chemical contained therein;

(c) apparatus for sensing said preprogrammed bar coded information on said spray etching tool for the chemical to be used with said spray etching tool and for sensing said preprogrammed bar coded information on said supply container for the chemical held within the supply container; and (d) a microprocessing controller for (i) comparing the two preprogrammed bar coded information sensings to determine if the proper chemical to be used in said spray etching tool and the chemical in the supply container match and (ii) sending a signal to an actuator to open said flow control valve connecting said supply container and said spray etching tool to permit the chemical to flow to said spray etching tool if the comparing of the two preprogrammed information sensings show a match or sending an error message and a signal to leave the flow control valve closed if the comparing of the two preprogrammed bar coded information sensings show a mismatch.

* * * * *